March 1, 1955 W. N. MILLAR 2,703,163
SPEED-RESPONSIVE AUTOMATIC CLUTCH
Filed Jan. 30, 1951
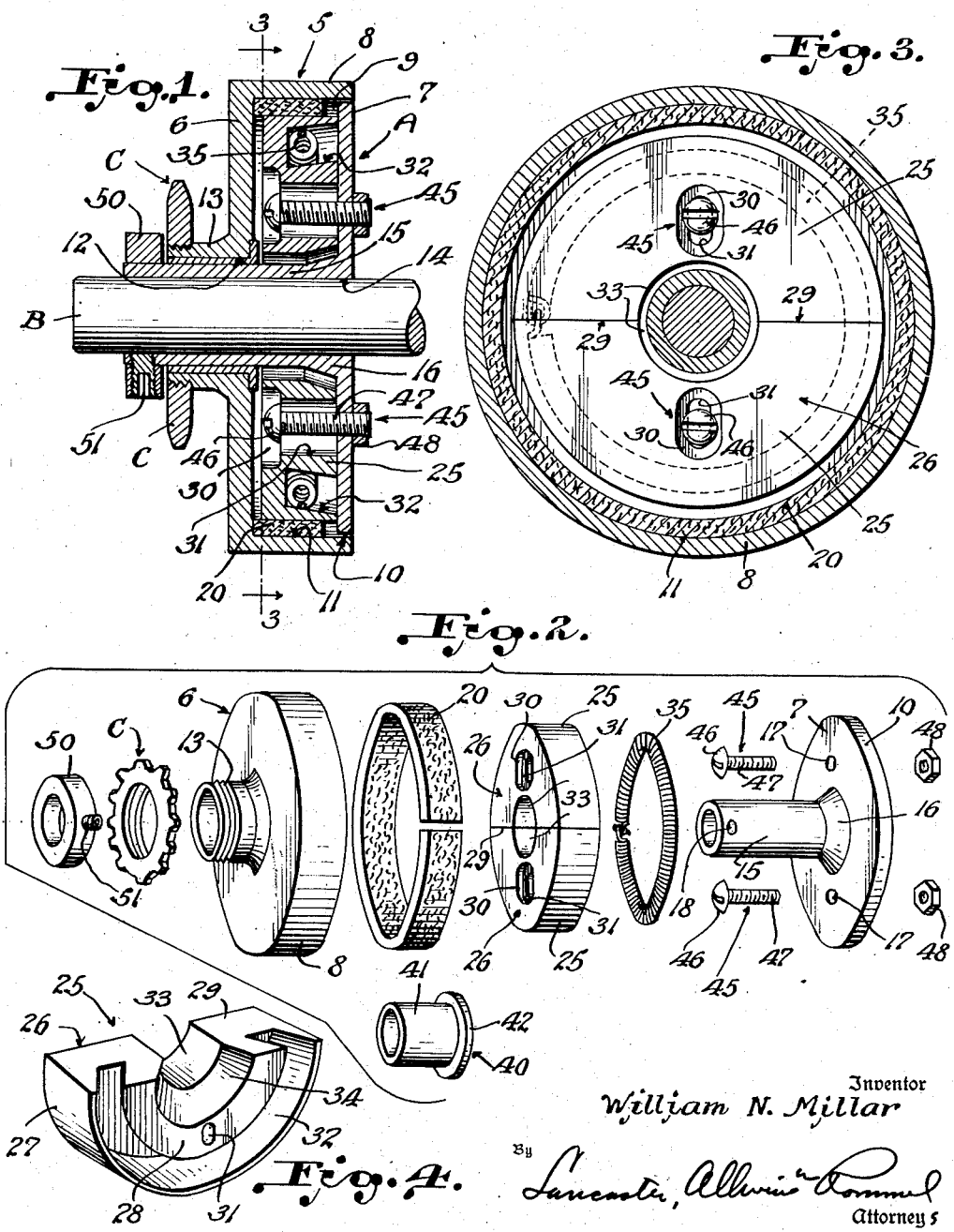
Inventor
William N. Millar

United States Patent Office 2,703,163
Patented Mar. 1, 1955

2,703,163

SPEED-RESPONSIVE AUTOMATIC CLUTCH

William N. Millar, Detroit, Mich.

Application January 30, 1951, Serial No. 208,630

1 Claim. (Cl. 192—105)

This invention relates to speed-responsive automatic clutches.

An important object of the invention is to provide a relatively small, compact and efficient automatic clutch, such as may be operatively connected between an engine, as an internal combustion engine, and the drawing and cutting mechanism of a lawn mower such as that disclosed in United States Patent 2,519,270 dated August 15, 1950 upon application of William N. Millar, Serial Number 771,769, filed September 2, 1949.

Another object of the invention is to provide a readily assembled and disassembled clutch, held together by a pair of readily-removable bolts and a set screw and collar.

Since the clutch disclosed may be employed as stated above, an object of the invention is to provide a clutch which is so housed that dry or moist grass clippings are not apt to find their way into the clutch housing and interfere with efficient operation of the clutch.

Another important object is to provide a clutch having a plurality of shoes normally held retracted by spring means, this means being well supported within the shoes against dislodgement.

Other objects and advantages of the invention will be apparent during the course of the following detailed description of the invention, taken in connection with the accompanying drawing, forming a part of this specification, and in which drawing:

Figure 1 is a transverse section of the new clutch in use and mounted upon a drive member.

Figure 2 is an exploded view of a driven member and of the various parts forming the clutch.

Figure 3 is a section substantially on the line 3—3 of Figure 1.

Figure 4 is a perspective of one of the shoes of the clutch.

In the drawing, wherein for the purpose of illustration is shown a preferred embodiment of the invention and wherein similar reference characters designate corresponding parts throughout the several views, the letter A designates the new clutch generally, the letter B a drive shaft and C a driven member.

The clutch A includes a housing 5 formed of a flanged disc portion 6, and a disc portion 7 with the disc portion 7 substantially closing the mouth defined by the outer end of the flange 8 of the flanged disc portion, so that a compartment 9 is provided, defined by these two portions 6 and 7. The periphery 10 of the disc portion 7 preferably extends nearly to the inner face 11 of the flange 8, with clearance preferably not over ½₂ inch.

The flanged disc portion 6 has an axial opening 12 surrounded by an exteriorly screw-threaded outwardly extending collar 13, and the disc portion 7 has an axial opening 14 surrounded by an elongated outwardly-extending tubular member 15, joining the disc body by a flared inner end 16. Between the flared inner end 16 and the periphery 10 are a pair of bolt shank-accommodating openings 17 spaced substantially 180° apart. Adjacent the free end of the tubular member 15 is set screw shank-accommodating radially-extending opening 18.

As shown in Figure 1, the housing 5 contains a clutch lining 20, this being a band of conventional clutch lining material which may be secured, as by an adhesive, to the inner face 11 of the flange 8. The housing also contains the clutch shoes 25. They are preferably alike and each comprises a segmental member having a substantially flat face 26 facing the disc of the flanged disc 6, a curved edge 27 facing the outer face of the lining 20 and adapted to frictionally contact that face of the lining, a substantially flat face 28 and paralleling the face 26, and a flat side face 29 joining the edge 27, the faces 26 and 28 extending to the edges 27 and 29. The face 26 of each sleeve is provided with a radially-extending, bolt heat receiving groove 30 and a bolt shank receiving slot 31 at the base of the groove and extending to the face 28, while the face 28 is provided with an arcuate spring-receiving groove 32 adjacent the edge 25 with the faces of the side walls of the groove 32 sloping or extending toward the curved opening 33 in the flat side face 29, as is clear in Figures 1 and 4. This has been found to be important as will be subsequently explained. The opening 33 is beveled as at 34 adjacent where its surface joins the face 28 so as to fit around the flared inner end 16.

Contained within the housing 5 is also a resilient means to resist outward movement of the shoes 25. This is shown as a contraction coil spring 35 extending along the two grooves 32 of the two assembled shoes 25 (i. e., with their faces 29 confronting each other), and the ends of the spring 35 joined, as by winding them together. Because of the sloping faces of the walls of the groove 32, the spring normally rides along these faces to the bottoms of the grooves and will not be apt to subsequently move toward the mouths of the grooves 32 nor drops from these grooves.

Between the inner face of the collar 13 and the outer face of the tubular member 15 is a suitable bearing 40 comprising a collar 41 and outwardly-extending flange 42 at its inner end with the flange fitting into a suitable circular recess in the inner face of the disc of the flanged disc 6, as may be seen in Figure 1. This bearing 40 provides an oil receiving or anti-friction surface.

Means to slidably secure the shoes 25 to the disc portion 7 may be suitable bolts 45 with their heads 46 disposed within and slidable along the grooves 30 and their shanks 47 extending through and slidable transversely along the slots 31. The free end portions of the shanks extend through the openings 17 and outwardly of the disc portion 10 and receive suitable nuts 48, as in Figure 1.

When the clutch A is assembled as in Figure 1, the driven member C, as a sprocket wheel, having suitable screw threads, is secured upon the screw threads of the collar 13 and the clutch A then mounted upon the drive shaft B and detachably secured thereto as by a lock collar 50 carrying a set screw 51 adapted to extend into and through the opening 18 and bear against the drive shaft B. Of course this collar 50 and set screw 51 prevent longitudinal movement of the disc portion 7 along the drive shaft and secure this portion to the drive shaft for rotation therewith. It also prevents, as is clear from Figure 1, any but a very limited movement of the flanged disc portion 7 along the drive shaft in one direction.

As the drive shaft B rotates, it causes the shoes to travel outwardly, by centrifugal force to frictionally contact the lining 20 and, thus, the flanged disc portion 6 and driven member C attached thereto, will rotate. Conversely, as the drive shaft B slows and stops, the spring 36 will cause the shoes 25 to retract and rotation of the flanged portion 6 and driven member C will slow down and cease. But neither movement of the shoes, as well as jars and the like, will dislodge the spring 35.

The entire clutch may be constructed with a housing 5 substantially one inch thick and four inches in diameter, for example, and still provide a clutch operating wholly satisfactory for use in association with a power lawn mower drive.

Various changes may be made to the form of invention herein shown and described without departing from the spirit of the invention or scope of the claim.

What is claimed is:

In a speed-responsive clutch for lawn mowers, a drive shaft-attached housing portion comprising a drive shaft-embracing tubular member and a first disc rigid therewith and having a flat inner face; a second disc mounted for rotation upon said tubular member and an outer flange rigid with the second disc and normal thereto, the periphery of said first disc facing the inner face of the outermost portion of said flange and being closely adjacent thereto, said portions defining a compartment; a plurality of clutch shoes in said compartment in contact with and slidable over said inner face of said first disc; a clutch lining secured to the inner face of said flange; means slidably and detachably securing said shoes to said first disc to slide, due to centrifugal force upon rotation of said first disc, to and contact said lining; each shoe having two opposite faces, a lining-contacting face and an arcuate and open-ended groove in one of said opposite faces, said groove being concentric with the axis of rotation of said first disc, said groove having a bottom, paralleling said opposite faces, and opposite parallel faces inclined outwardly from said bottom and away from the axis of rotation of said first disc; and means to slide said shoes away from said lining when rotation of said first disc slows and stops, comprising an elongated retraction coil spring extending in and through each of said grooves and secured together at its ends, said spring being under least tension when said spring is at the bottoms of the grooves and said shoes are nearest said axis of rotation, and said spring being under greatest tension when said shoes contact said lining and said spring is at the mouths of said grooves, said spring being normally disposed upon the bottoms of said grooves.

References Cited in the file of this patent

UNITED STATES PATENTS

| | | |
|---|---|---|
| 844,384 | Meston et al. | Feb. 19, 1907 |
| 1,338,891 | Woodhouse | May 4, 1920 |
| 1,956,417 | Else | Apr. 24, 1934 |
| 2,000,713 | Norris | May 7, 1935 |
| 2,016,643 | Lowndes | Oct. 8, 1935 |
| 2,455,086 | Papas | Nov. 30, 1948 |
| 2,504,177 | Bruestle | Apr. 18, 1950 |
| 2,519,270 | Millar | Aug. 15, 1950 |
| 2,688,390 | Thomas, Jr. | Sept. 7, 1954 |

FOREIGN PATENTS

| | | |
|---|---|---|
| 611,190 | Great Britain | Oct. 26, 1948 |
| 18,950/34 | Australia | June 1935 |